May 12, 1964 W. WOJTULEWICZ 3,133,244
MAGNETIC FIELD DETECTOR AND RESOLVER HAVING
A TWO SECTION HOUSING FOR THE DETECTOR
Filed Sept. 15, 1960 4 Sheets-Sheet 1

WACLAW WOJTULEWICZ
INVENTOR.

BY Andrew L. Bain
George B. Oujross
ATTORNEYS

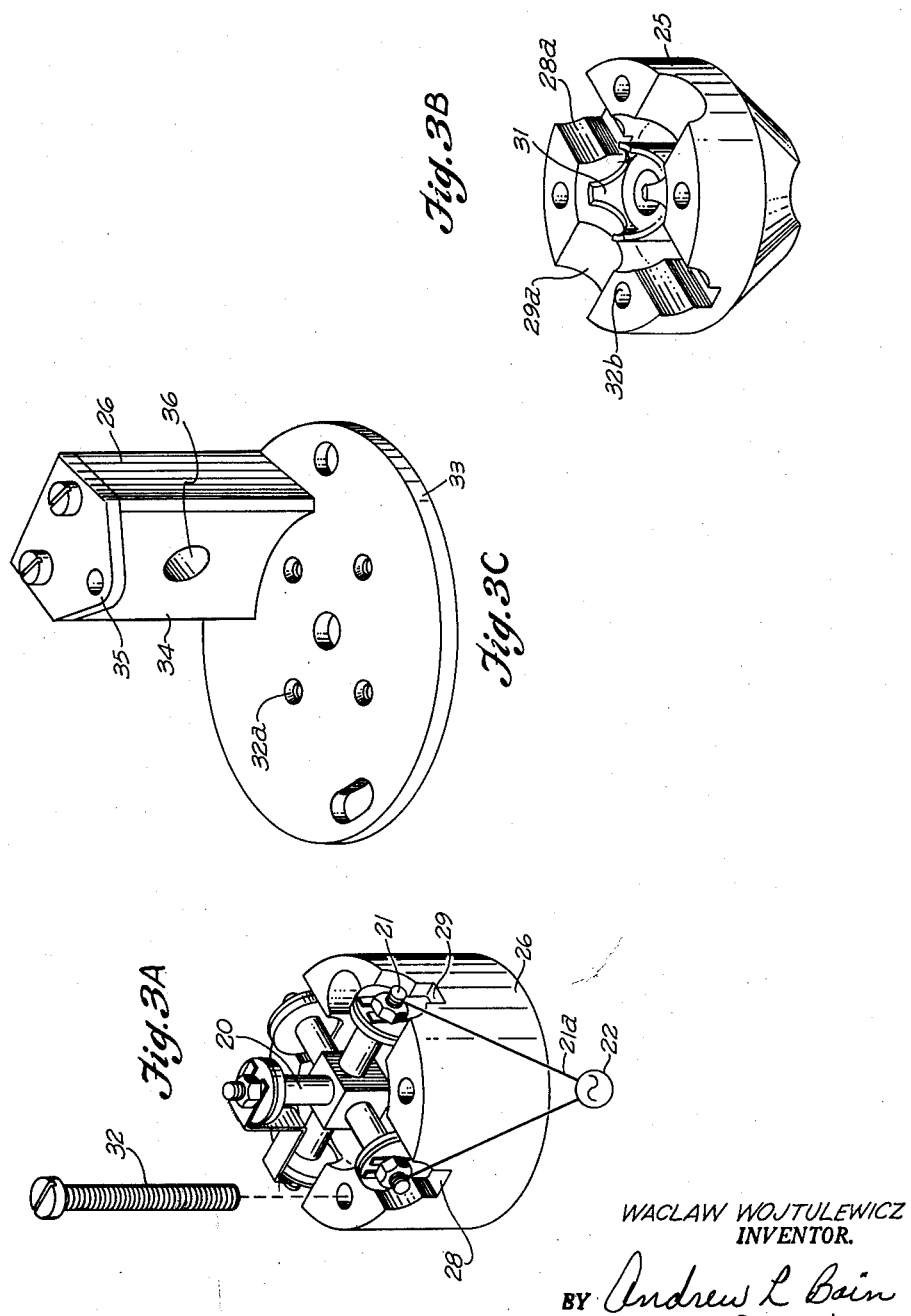

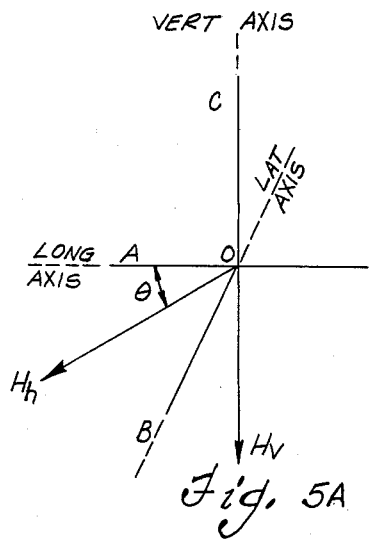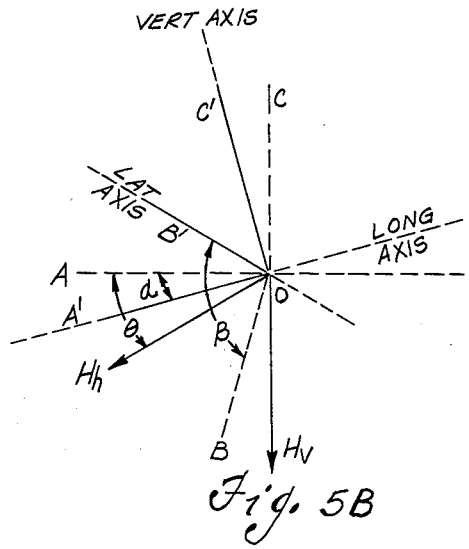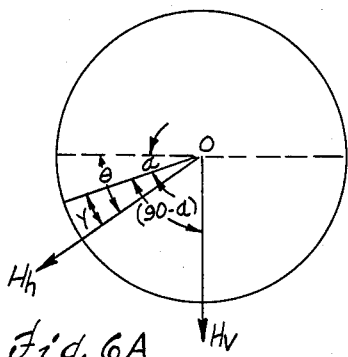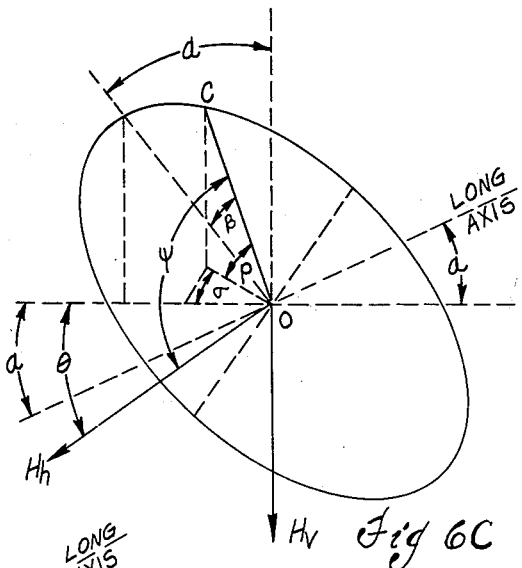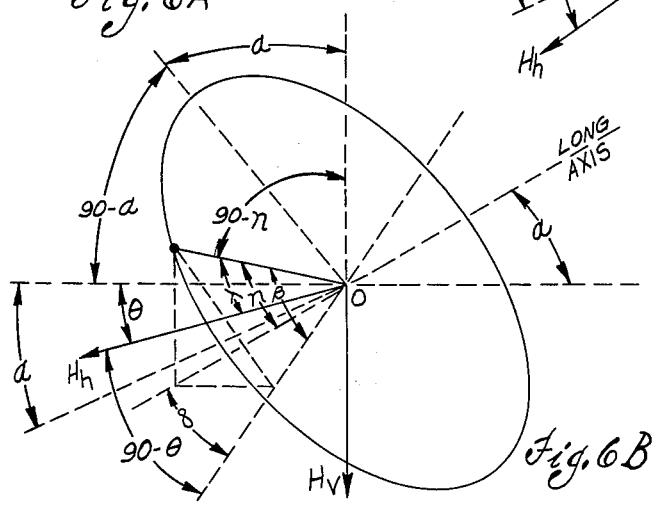

United States Patent Office 3,133,244
Patented May 12, 1964

3,133,244
MAGNETIC FIELD DETECTOR AND RESOLVER HAVING A TWO SECTION HOUSING FOR THE DETECTOR
Waclaw Wojtulewicz, Paterson, N.J., assignor to General Precision Inc., Little Falls, N.J., a corporation of Delaware
Filed Sept. 15, 1960, Ser. No. 56,182
3 Claims. (Cl. 324—43)

The present invention relates to a magnetic detector sensing element, and more particularly to a three dimensional sensing element.

It is well known that among the types of magnetic detector sensing elements are saturable inductors. One type of saturable inductor includes a core composed of a high permeability magnetic material which usually takes the form of a long slender rod. A coil is wound around the rod, the two ends of the coil leading to the detector output. The ends of the rod on the other hand are connected to a source of A.C. current which acts as the excitation current. The output winding will have induced therein an alternating voltage which has a frequency double that of the applied excitation frequency. Such a detector in an improved form has been described by my fellow General Precision, Inc., worker Alfred Pizzigoni in his patent application entitled Magnetic Detector Sensing Element, Serial No. 822,221, filed June 23, 1959, now abandoned. This improved detector of Alfred Pizzigoni generally comprises a long slender core with two end members. These end members take the form of circular disks and have a relatively high permeability. With these two end members, it is possible to converge or gather magnetic lines of force into the core thereby creating in the core a stronger magnetomotive force than otherwise obtainable. In winding the coil of the output detector about the core, care is taken to have the winding as perfectly coaxial with respect to the core as possible. Naturally, since this is a spiral winding absolute perfection is impossible, but near perfection is attainable so that the alternating transverse flux induced in the output winding outside of a magnetic field is almost zero. When such a device is placed parallel to the flux or principle lines of force of a magnetic field, i.e., one end of the core faces north and the other end of the core faces south, the output is at maximum. When the core is turned at right angles or 90° to the line extending between the north and south poles of the magnetic field, the output should be at a minimum and in an ideal instrument should read zero. At angles intermediate 0° and 90° the output can be considered as a trigonometric function.

The instrument just described as well as other devices of the prior art operating on similar principles however, serve only as a two-dimensional device. Thus the amount of information provided is limited.

Although many attempts have been made to provide a magnetic detector sensing device which can provide three-dimensional information, none, as far as I am aware have ever been successful when carried out into practice.

It has now been discovered that a sensing device can be provided which can furnish three-dimensional information as to a magnetic field.

Thus, it is an object of the present invention to provide a device which can detect a magnetic field, and furnish information as to the intensity thereof.

A further object of the present invention is to furnish a device which can detect a magnetic field and furnish three-dimensional information with respect thereto.

Still another object of the present invention is to furnish a device for the detection of a magnetic field which can be used over a wide temperature range and particularly at high temperature environments in the order of 1000° F.

The invention also contemplates a device which is small, compact, readily usable with conventional computer circuitry, and inexpensive to manufacture.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIGURE 3A shows the housing illustrated in FIGURE 2 with the cover portion and support removed therefrom to better illustrate the mounting of the magnetic sensing element of FIGURE 1 in the housing;

FIGURE 3B shows the removed cover of the housing of FIGURE 3A;

FIGURE 3C illustrates the support for the housing shown in FIGURES 3A and 3B;

FIGURE 5A is a diagram in graphic form of the operation of the device herein contemplated under ideal conditions;

FIGURE 5B is a diagram in graphic form of the operation of the device herein contemplated under actual conditions;

FIGURE 6A is a graphic illustration showing the operation of one of the axis of the device contemplated herein;

FIGURE 6B illustrates in graphic form the operation of another axis of the device contemplated herein;

FIGURE 6C illustrates in graphic form the operation of the third axis of the device contemplated herein, and FIGURE 7 gives a schematic explanation of the electronic implementation of the device contemplated herein.

Figure 1B:
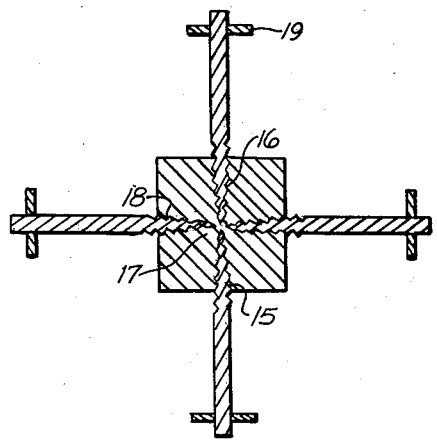
FIGURE 1B is a view along lines B—B of FIGURE 1.
Figure 4:
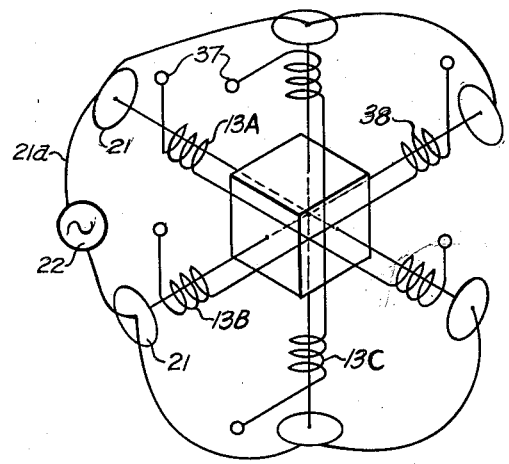
FIGURE 4 illustrates the windings and electrical connections for the component contemplated in FIGURE 1.
Figure 2:
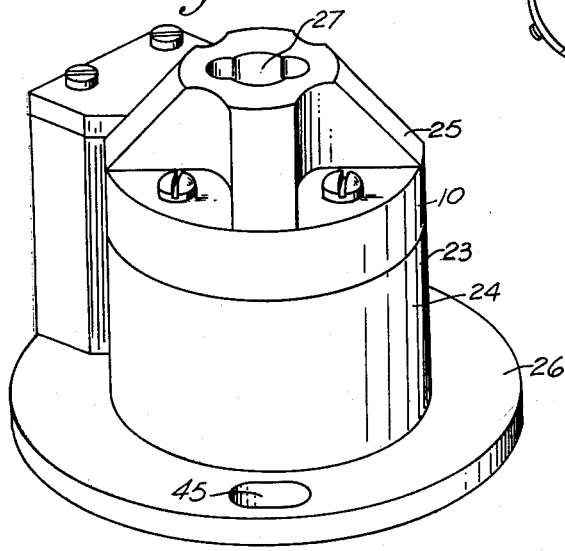
FIGURE 2 illustrates the closed housing containing the element depicted in FIGURE 1.
Figure 1A:
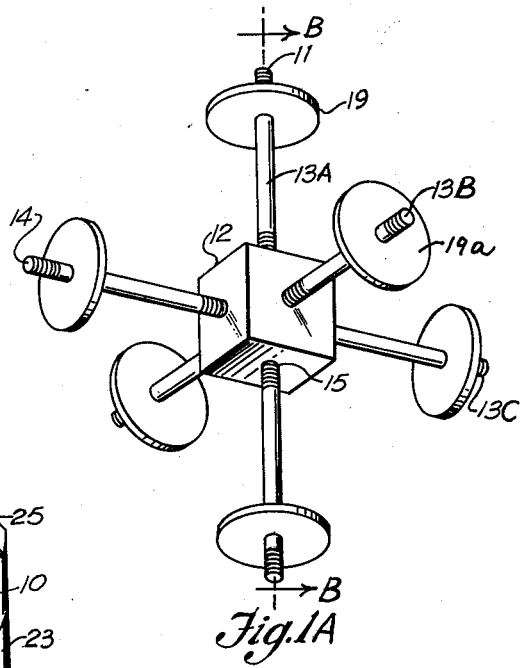
FIGURE 1A is a perspective view of the principal component of a three dimensional magnetic sensing element herein contemplated.

Generally speaking, the present invention contemplates an improvement in a magnetic detector for measuring the magnitude of a magentic field in which the detector is placed, and compirses, in combination, a center boss, three core axes retained by said center boss, each core axis being at an angle of 90° to the other two axes, an output winding surrounding each of said axes, and a circuit connecting said three axes in parallel. Advantageously, magnetic end means can be coupled to each of said axes to converge or gather magnetic lines of force into each core axis. Associated with said magnetic detector are electronic resolvers furnishing the trigonometric functions corresponding to the angle of each core axis to the maximum-minimum magnetic field magnitude and resolvers to correlate the information as to said trigonometric functions so as to provide three dimensional information regarding the position of the magnetic detector in the magnetic field.

In carrying the invention into practice, the magnetic detector 10 herein contemplated comprises a star-shaped core assembly 11. This assembly includes, a cube center boss 12, three axes at right angles to each other; 13A, 13B and 13C, and poles 14 at opposed ends of each axis. Star-shaped core assembly is a precision made component. The cube, if a cube shape is used must be an exact cube. The holes or apertures 15 which support the axes must be centered right in the middle of each square face of the cube; precisely at right angles to each other. Each axis 13A, 13B and 13C of course has two sections. The inner tip 16 of each section is preferably tapered so that the six tips will dove tail to center point 17 which is the exact center of the cube. To set the axes at precisely right angles to each other, there must be close tolerance between the inner wall of aperture 15 and the axis therein. Furthermore, the aperture 15 and the axis inner end 18 is preferably threaded. To enhance the axial flux of the core, end members 19 are threadedly fitted onto the outer ends of each core. Advantageously, the axes elements and the end members can be made of a relatively low permeability, high Curie point magnetic material, such as silicon iron or an alloy of cobalt and iron sold under the trademark "Supermendur," for instance. After the axes have been placed in the center boss, the entire assembly excepting the outer faces 19a of the end members is sprayed with a thin ceramic coating 20, made of glass bonded mica, and sold under the trade name of "Mycalex." Associated with two separate end members which are not paired are connectors 21 adapted to furnish the excitation current to the end members in parallel connection. Thus, there is an A.C. source 22 having leads 21a connected to connectors 21, and from connectors 21 the current is distributed in parallel between the end members of axes 13A, 13B and 13C. The entire assembly 11 is mounted in a housing 23 comprising an insulated ceramic housing base 24, a cover 25 and housing support 26 which is adapted to partially hold the base and cover together and align the axes at 90° and also affix the entire device to utilization means. The housing base 24 has a center aperture adapted to retain one of the axis which will normally be in the vertical plane and two channels 28 and 29 at right angles to the vertical aperture and at right angles to each other and adapted to support the two other axes which will normally lie in the horizontal plane. Cover 25 likewise has a center aperture 27 corresponding to the base aperture and two channels 28a and 29a also corresponding to base channels 28 and 29, the apertures and channels being so disposed as to snug fit perfectly over the star-shaped core assembly 11. Advantageously, both the base and cover will have corresponding retaining protrusions 31, adapted to retain center boss 12. Star-shaped core assembly 11 will thus fit precisely in housing 23, cover 25 being placed over base 26, base and cover being held in firm engagement by suitable retaining means, e.g., screws 32. The entire housing is then mounted in support 26. Support 26 has a round support floor 33 made from non-magnetic material, e.g., "Inconel" having threaded apertures 32a adapted to receive screws 32 passing through corresponding apertures 32b in housing 23. At one end of the floor is a wall 34 having an extension 35 of similar material adapted to clamp tightly over cover 25 so as to firmly hold the cover and base of the housing between the floor and wall extension of the support. Preferably connectors 21 are associated with the two horizontal end members at right angles to each other and so disposed that wall 34 is therebetween. There may be an opening 36 in said wall as well as in said housing for the electrical circuitry. In other words, the output leads 37 may be directed through opening 36 of the support and housing. The windings 38 around each axes are close and as near as possible at right angles to the axis around which they are wound. Each winding starts at one end piece revolving inwardly along the axis towards the center boss, over and across the center boss to the other side thereof and thence outwardly from the center boss along the axis to the other end piece. Since the windings are each at right angles to the respective axes, they are at right angles to each other.

If the detector 10 is placed in a uniform magnetic field, such as at a point of the earth's magnetic field, for instance, a magneto-motive force will be produced which will cause an axial flux through each axis-core 13A, 13B and 13C having a magnitude proportional to the axial component of the magnetic field sensed by the respective axis-cores. For the purpose of giving those skilled in the art a better understanding of the invention, the following analysis is given of the magnetic detector herein contemplated in connection with its use on an aircraft.

In the following analysis an aircraft nose down condition gives a positive elevation angle and a right wing down condition gives a positive roll angle.

For convenience, the following definitions have been used:

$H_h$=horizontal component of earth's magnetic field.
$H_v$=vertical component of earth's magnetic field.
$H_A$=earth's field detected by sensing element parallel to aircraft's longitudinal axis, element A.
$H_B$=earth's field detected by sensing element parallel to aircraft's lateral axis, element B.
$H_C$=earth's field detected by sensing element parallel to aircraft's vertical axis, element C.
$\alpha$=elevation angle of aircraft.
$\beta$=roll angle of aircraft.
$\theta$=magnetic heading angle of aircraft; in the vertical position this heading is determined by the direction of the aircraft's landing gear.
$\phi$=heading angle determined by the azimuth detecting system.

FIGURES 5A and 5B illustrate the relative positions of the three legs of a fixed axis magnetic azimuth detector relative to the aircraft. FIGURE 5A shows graphically the detector's elements (element A being parallel to the aircraft's longitudinal axis, element B being parallel to the aircraft's lateral axis, and element C being parallel to the aircraft's vertical axis) as they would appear in relation to the horizontal and vertical components of the earth's magnetic field with an aircraft in level flight on the magnetic heading $\theta$. In FIGURE 5B the magnetic azimuth detector elements have been rotated to the positions A', B', and C', respectively, due to the aircraft's experiencing of the elevation angle $\alpha$ and the roll angle $\beta$. The total field sensed by each of the elements in this general case will now be determined. For each element, the positive direction of the detected field will be considered to be outward from point 0.

FIGURE 6A illustrates element A and its plane of rotation through 360 degrees of elevation. This figure also shows the relation between element A at some arbitrary elevation angle $\alpha$ and the components of the earth's magnetic field. This relation is independent of the aircraft roll angle $\beta$ since the direction of element A is parallel to the longitudinal (roll) axis of the aircraft.

The portion of the horizontal field detected by element A is:

$$H_{A_h}=H_h \cos \gamma = H_h \cos \alpha \cos \theta$$

The portion of the vertical field detected by element A is:

$$H_{A_v}=H_v \cos (90-\alpha)$$
$$=H_v \sin \alpha$$

The total field detected by element A is then:

$$H_A = H_{A_h} + H_{A_v}$$
(Equation I) $\quad = H_h \cos \alpha \cos \theta + H_v \sin \alpha$ FIGURE 6B shows element B and its plane of rotation through 360 degrees of roll for an arbitrary elevation angle $\alpha$. In the figure element B is shown in its relation to the field components $H_h$ and $H_v$ for some value $\beta$ of aircraft roll. Also, in the figure, $\theta$ is the angle between the horizontal component of the earth's magnetic field $H_h$ and the horizontal projection of the longitudinal axis of the detector.

Consideration of FIGURE 6B leads to the following expressions:

$$\sin \eta = \cos \alpha \sin \beta$$

$$\cos \eta = \sqrt{1 - \cos^2 \alpha \sin^2 \beta}$$

$$\sin \delta = \frac{\cos \beta \sin \alpha}{\sqrt{1 - \cos^2 \alpha \sin^2 \beta}}; \quad \cos \delta = \frac{\cos \beta}{\sqrt{1 - \cos^2 \alpha \sin^2 \beta}}$$

The portion of the earth's horizontal field sensed by element B is:

$$H_{B_h} = H_h \cos \lambda$$
$$= H_h \cos (90 - \theta - \delta) \cos \eta$$
$$= H_h \cos \eta [\cos (90 - \theta) \cos \delta + \sin (90 - \theta) \sin \delta]$$
$$= H_h \cos \eta [\cos \delta \sin \theta + \sin \delta \cos \theta]$$

$$H_{B_h} = H_h \sqrt{1 - \cos^2 \alpha \sin^2 \beta} \left[ \frac{\cos \beta}{\sqrt{1 - \cos^2 \alpha \sin^2 \beta}} \sin \theta + \frac{\sin \alpha \sin \beta}{\sqrt{1 - \cos^2 \alpha \sin^2 \beta}} \cos \theta \right]$$

$$= H_h [\cos \beta \sin \theta + \sin \alpha \sin \beta \cos \theta]$$

That portion of the earth's vertical field sensed by element B is:

$$H_{B_v} = -H_v \cos (90 - \eta)$$
$$= -H_v \sin \eta$$
$$= -H_v \cos \alpha \sin \beta$$

The total field sensed by element B is then:

$$H_B = H_{B_h} + H_{B_v}$$

(Equation II) $\quad = H_h[\cos \beta \sin \theta + \sin \alpha \sin \beta \cos \theta]$
$\quad - H_v \cos \alpha \sin \beta$ FIGURE 6C shows element C and its plane of rotation through 360 degrees of roll for an arbitrary elevation angle $\alpha$.

$\beta$ and $\theta$ are aircraft roll and magnetic heading respectively, as in the previous cases.

It can be seen that:

$$\sin \rho = \cos \alpha \cos \beta$$
$$\cos \rho = \sqrt{1 - \cos^2 \alpha \cos^2 \beta}$$
$$\sin \sigma = \frac{\sin \beta}{\sqrt{1 - \cos^2 \alpha \cos^2 \beta}}$$
$$\cos \sigma = \frac{\sin \alpha \cos \beta}{\sqrt{1 - \cos^2 \alpha \cos^2 \beta}}$$

The portion of the horizontal field sensed by element C is:

$$H_{C_h} = H_h \cos \psi$$
$$= H_h \cos (\theta + \sigma) \cos \rho$$

$$H_{C_h} = \sqrt{1 - \cos^2 \alpha \cos^2 \beta}[\cos \theta \cos \sigma - \sin \theta \sin \sigma]$$

$$= H_h \sqrt{1 - \cos^2 \alpha \cos^2 \beta} \left[ \frac{\sin \alpha \cos \beta}{\sqrt{1 - \cos^2 \alpha \cos^2 \beta}} \cos \theta - \frac{\sin \beta}{\sqrt{1 - \cos^2 \alpha \cos^2 \beta}} \sin \theta \right]$$

$$= H_h[\sin \alpha \cos \beta \cos \theta - \sin \beta \sin \theta]$$

Also, the portion of the earth's vertical field sensed by element C is:

$$H_{C_v} = H_v \sin \rho$$
$$= H_v \cos \alpha \cos \beta$$

Thus, the total field sensed by element C is:

$$H_C = H_{C_h} + H_{C_v}$$

(Equation III) $\quad = H_h[\sin \alpha \cos \beta \cos \theta - \sin \beta \sin \theta]$
$\quad - H_v \cos \alpha \cos \beta$ Consider the three mutually perpendicular detector elements A, B, and C where A is fixed along the aircraft's longitudinal axis, B is fixed along the aircraft's lateral axis, and C is fixed along the aircraft's vertical axis. Under any condition of aircraft elevation $\alpha$, aircraft bank $\beta$, and aircraft heading $\theta$, the magnetic fields detected by each of these windings therefore are:

$H_A = H_h \cos \alpha \cos \theta + H_v \sin \alpha$ (Equation I)
$H_B = H_h[\cos \beta \sin \theta + \sin \alpha \sin \beta \cos \theta] - H_v \cos \alpha \sin \beta$ (Equation II)
$H_C = H_h[\sin \alpha \cos \beta \cos \theta - \sin \beta \sin \theta] - H_v \cos \alpha \cos \beta$ (Equation III)

Multiplying each of these fields by the appropriate function of roll and elevation angles and then adding the resulting products gives:

$H_y = H_A \cos \alpha + H_B \sin \beta \sin \alpha + H_C \cos \beta \sin \alpha$ (Equation IV)

$= H_h \cos^2 \alpha \cos \theta + H_v \sin \alpha \cos \alpha$
$\quad + H_h \sin \alpha \sin \beta \cos \beta \sin \theta$
$\quad + H_h \sin^2 \alpha \sin^2 \beta \cos \theta - H_v \sin \alpha \sin^2 \beta \cos \alpha$
$\quad + H_h \sin^2 \alpha \cos^2 \beta \cos \theta$
$\quad\quad\quad - H_h \sin \alpha \sin \beta \cos \beta \sin \theta$
$\quad - H_v \sin \alpha \cos \alpha \cos^2 \beta$ $= H_h \cos \theta[\cos^2 \alpha + \sin^2 \alpha \sin^2 \beta + \sin^2 \alpha \cos^2 \beta]$
$\quad + H_h \sin \theta[\sin \alpha \sin \beta \cos \beta - \sin \alpha \sin \beta \cos \beta]$
$\quad + H_v[\sin \alpha \cos \alpha - \sin \alpha \sin^2 \beta \cos \alpha$
$\quad\quad\quad - \sin \alpha \cos \alpha \cos^2 \beta]$ $= H_h \cos \theta$ (Equation V)

Similarly:

$H_x = H_B \cos \beta - H_C \sin \beta$ (Equation VI)
$= H_h \cos^2 \beta \sin \theta + H_h \sin \alpha \sin \beta \cos \beta \cos \theta$
$\quad - H_v \cos \alpha \sin \beta \cos \beta - H_h \sin \alpha \cos \beta \sin \beta \cos \theta$
$\quad + H_h \sin^2 \beta \sin \theta + H_v \cos \alpha \sin \beta \cos \beta$ $= H_h \sin \theta[\cos^2 \beta + \sin^2 \beta]$
$\quad + H_h \cos \theta[\sin \alpha \sin \beta \cos \beta - \sin \alpha \cos \beta \sin \beta]$
$\quad + H_v[\cos \alpha \sin \beta \cos \beta - \cos \alpha \sin \beta \cos \beta]$ $= H_h \sin \theta$ (Equation VII)

By applying $H_x$ and $H_y$ to the stator windings of a resolver, the shaft angle $\phi$ necessary to drive a rotor winding to null by means of a servo is:

$$\tan \phi = \frac{H_x}{H_y} = \frac{H_h \sin \theta}{H_h \cos \theta} = \tan \theta$$

(Equation VIII)

therefore:

$$\phi = \theta$$

Thus it is seen that a resolver shaft angle would faithfully follow the magnetic heading angle $\theta$ for all conditions of aircraft pitch and bank.

Figure 7:
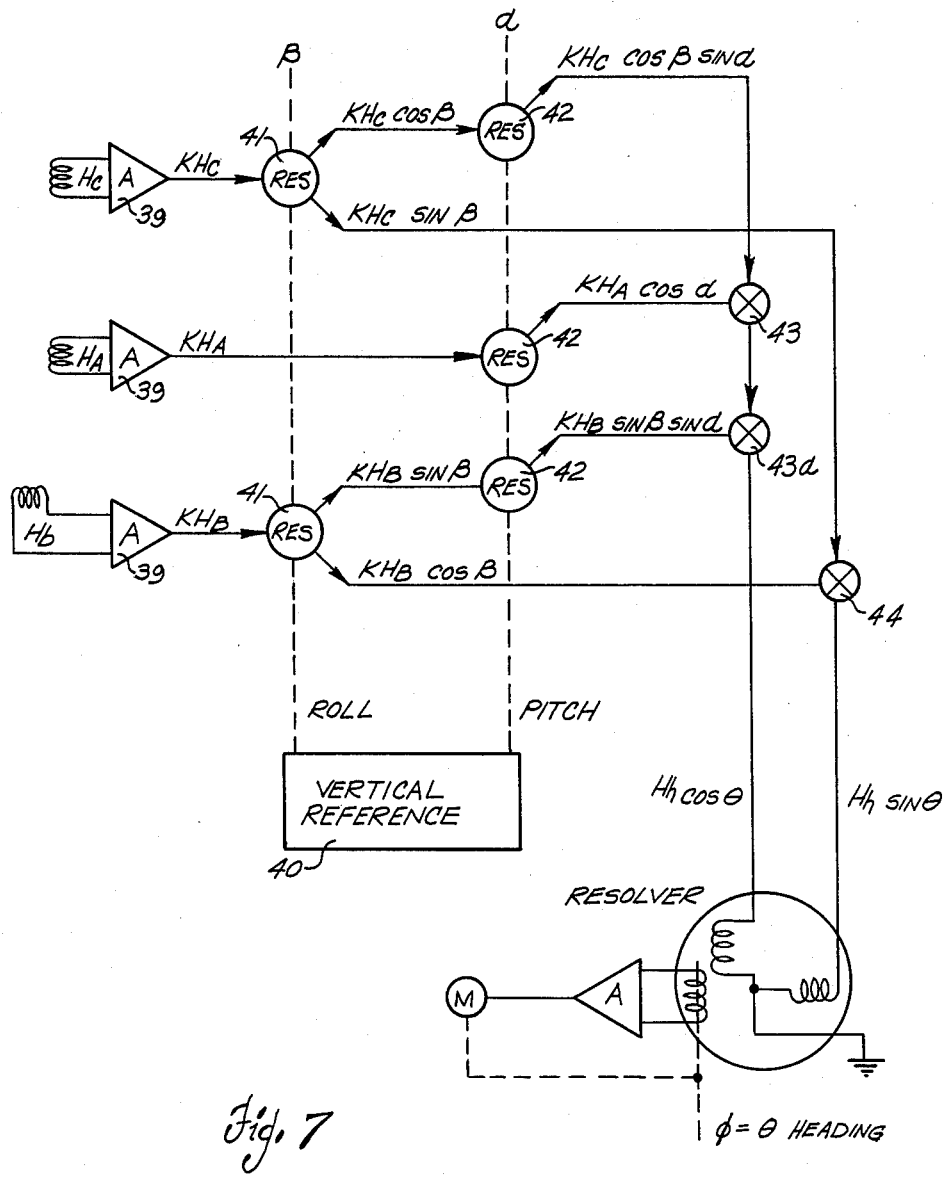

The mathematical analysis hereinbefore described may be implemented by the appropriate electronic components as shown in FIGURE 7, in which the three axes 13A, 13B and 13C are schematically illustrated. The respective outputs are fed into amplifiers 39, which amplify the respective outputs by a factor of K, so that values representing the amplified total fields felt by the respective axes, namely $KH_A$, $KH_B$, and $KH_C$ are provided. These outputs are fed to sine-cosine resolvers 41 responsive to the aircraft vertical reference system 40. Since axis 13A is parallel to the aircraft longitudinal axis, it is not coupled with a roll sine-cosine resolver. $KH_B$, the magnetic function of the aircraft lateral axis and $KH_C$, the magnetic function of the aircraft vertical axis are fed to resolvers 41 adapted to furnish the sine or cosine of the aircraft roll bank $\beta$, i.e., providing outputs, $KH_C \cos \beta$; $KH_C \sin \beta$; $KH_B \sin \beta$; and $KH_B \cos \beta$. There can now be furnished to pitch axis sine-cosine resolvers 42 the functions $KH_C \cos \beta$; $KH_A$ and $KH_B \sin \beta$; this provides outputs $KH_C \cos \beta \sin \alpha$; $KH_A \cos \alpha$; and $KH_B \sin \beta \sin \alpha$.

In other words we now have the factors which when added by resolvers 43 and 43a will provide Equation IV:

$KH_y = KH_A \cos \alpha + KH_B \sin \beta \sin \alpha + KH_C \cos \beta \sin \alpha$ Similarly, by feeding the already obtained $KH_C \sin \beta$ and $KH_B \cos \beta$ to a resolver 44 we obtain the difference (Equation VI) $H_x = KH_B \cos \beta - KH_C \sin \beta$ We now have the factors $H_h \sin \theta$ and $H_h \cos \theta$ which when applied to the stator windings of resolver 45 and driven to null by the rotor winding, will provide (Equation VIII)

$$\tan = \frac{H_x}{H_y} = \frac{H_h \sin \theta}{H_h \cos \theta} = \tan \theta$$

Thus there is provided a three dimensional magnetic sensing element providing correct information irrespective of aircraft roll or pitch.

Housing 23 mounted in housing support 26 is thus rigidly affixed to the aircraft, and the respective axes 13A, 13B and 13C are aligned along the aircraft longitudinal lateral and vertical axes. To insure alignment, adjustment may be necessary, particularly along the longitudinal axis. Thus, housing support 26 may have an adjustable aperture 45 to properly align the magnetic detector in the horizontal plane.

Although the present invention has been described in conjunction with preferred embodiments, it is to be understood that modifications and variations may be resorted to without departing from the spirit and scope of the invention as those skilled in the art will readily understand. Such modifications and variations are considered to be within the perview and scope of the invention and appended claims.

I claim:

1. A magnetic detector for measuring the magnitude of a magnetic field in which the detector is placed, comprising in combination, a cube-shaped boss with flat rectangular faces;

cores retained by said boss, each core including an elongated central cylindrical portion, a tapered inner portion which is embedded in said boss at right angles to and in the center of one of said faces, and a disc-shaped outer magnetic end member axially mounted on said cylindrical portion, the cores embedded in two opposed faces of said boss defining an axis, all of said cores defining three orthogonal axes;

an electric circuit for feeding excitation current to each of said cores;

output windings for each of said axes defined by said cores, said windings for each of said axes being placed around cores embedded in said opposed two faces and across said boss;

a housing base having a center aperture therein for retaining the cores defining one of the axes as well as two channels at right angles to said aperture and to each other for accommodating the remaining cores, a housing cover having an aperture and channels corresponding to and adapted to mate with those of said base, said boss and cores being housed between said base and cover, and retaining means retaining said base and cover;

resolver assemblies coupled to each of said output windings furnishing trigonometric functions corresponding to the angles between each of said axes and the maximum-minimum magnetic field magnitude; and, resolver means connected to the output of said resolver assemblies receiving the trigonometric function information supplied therefrom so as to provide three dimensional information regarding the position of the magnetic detector in a magnetic field.

2. A detector as claimed in claim 1, said cores and end members being made of high Curie point magnetic material covered with a coating of glass bonded mica.

3. A detector as claimed in claim 2, each of said output windings being close and as near as possible at right angles to the axis around which they are wound, each winding starting at an end member revolving inwardly along the core towards the boss, across the boss to the other side thereof and thence outwardly from the boss along the other core defining the same axis to the other end piece.

References Cited in the file of this patent

UNITED STATES PATENTS

| | | |
|---|---|---|
| 2,338,732 | Nosker | Jan. 11, 1944 |
| 2,436,394 | Maltby et al. | Feb. 24, 1948 |
| 2,543,843 | Frosch | Mar. 6, 1951 |
| 2,597,125 | Noxon | May 20, 1952 |
| 2,710,942 | Emerson | June 14, 1955 |
| 2,958,819 | Bregar | Nov. 1, 1960 |

OTHER REFERENCES

Electronics, January 1950; pages 165–171, article by Seaton.